United States Patent
Hilal et al.

[11] Patent Number: 5,010,255
[45] Date of Patent: Apr. 23, 1991

[54] HIGH CURRENT MAGNETOHYDRODYNAMIC GIGAWATT PULSE GENERATOR

[75] Inventors: Mohamed A. Hilal, Madison, Wis.; Jerome F. Parmer, San Diego, Calif.

[73] Assignee: General Dynamics Corporation, Convair Division, San Diego, Calif.

[21] Appl. No.: 461,510

[22] Filed: Jan. 5, 1990

[51] Int. Cl.$^5$ .......................... H03K 3/38; H03K 31/00
[52] U.S. Cl. ................................... 307/106; 307/306; 310/11; 323/360
[58] Field of Search ....................... 307/106, 149, 306; 310/11, 10; 328/65; 323/360

[56] References Cited

U.S. PATENT DOCUMENTS

| | | | |
|---|---|---|---|
| 3,740,593 | 6/1973 | Zar | 310/11 |
| 4,122,512 | 10/1978 | Peterson et al. | 363/14 |
| 4,894,556 | 1/1990 | Hilal et al. | 307/106 |

Primary Examiner—A. D. Pellinen
Assistant Examiner—Johannssen
Attorney, Agent, or Firm—John R. Duncan; Frank D. Gilliam

[57] ABSTRACT

A disk type magnetohydrodynamic (MHD) generator/channel and a hybrid pulse power transformer (HPPT) with a superconductive primary and a normal secondary for producing high power and high current pulses is disclosed. The HPPT surrounds the MHD channel through which hot gas is supplied. The channel upstream from the HPPT is formed into a flat circular configuration with narrow portion directed perpendicular to the channel passing through the HPPT. A MHD disk generator is positioned on the opposite side of the channel directly opposed from the HPPT. The output from the MHD is connected to the primary of the HPPT. Prior to generating power, the superconducting primary winding of the HPPT is charged to a low current. The primary is then connected to the MHD generator/channel for conditioning. When the channel is fired causing gases to flow through the channel causing the magnet current to increase producing a higher primary field and hence more power generation. In this manner the MHD generator is self excited or conditioned and the MHD generator output is stored in the HPPT primary. The energy stored in the primary can be released to the secondary by driving the primary normal by any known method. Other configurations can be used such as conventional MHD channel generators. The primary winding can be made of high temperature superconductors when available.

4 Claims, 1 Drawing Sheet

HIGH CURRENT MAGNETOHYDRODYNAMIC GIGAWATT PULSE GENERATOR

BACKGROUND OF THE INVENTION

This invention relates to electrical transformers, and, more particulary to direct current transformers which relate to a combination of magnetohydrodynamic (MHD) disk type generators and superconductive transformers for producing pulses of gigawatt power by self conditioning.

Various MHD generator systems are known in the prior art. Some of these can be found in U.S. Pat. Nos. 3,179,824; 3,320,443; 3,368,089; 3,406,301; 3,483,404; 3,660,700 and 3,740,593.

An MHD generator using a superconductive magnet can be found in U.S. Pat. No. 3,740,593.

None of these prior references teach the combination of power generation and conditioning. Although the prior art achieves high power from the MHD generator devices none are self conditioned.

There has not been a MHD generator taught by the prior art that is capable of producing pulses of the magnitude produced by the present invention using a self conditioning method.

SUMMARY OF THE INVENTION

The present invention utilizes the primary of a HPPT transformer which is fully described in patent application Ser. No. 07/061,761 one of the inventors being a co-inventor of this application as the field for gas or plasma of the MHD generator. The primary of the HPPT is a superconducting winding and the secondary of the HPPT is a normal conducting winding. The channel for the gas or plasma which is utilized in the MHD generator passes through the center of the HPPT adjacent to the superconducting primary winding. In one embodiment the channel leaving the HPPT forms a cavity positioned ninety degrees from the channel passing through the HPPT. Positioned on the opposite wall of the channel from the HPPT is a MHD disk generator which receives power from the gas or plasma which is conditioned by a pre-existing current in the primary of the HPPT. The output of the MHD generator is connected to the superconducting primary of the HPPT. The power produced by the MHD generator is stored in the primary winding of the HPPT as current. The longer the plasma flows through the primary of the HPPT the more current that is added to the primary via the MHD generator and hence the more flux for conditioning the gas or plasma. When a sufficiently large quantity of current is collected by the primary, the primary can be caused to go normal which transfers the stored current in primary to the normal secondary of the HPPT as a high power pulse which can be delivered to a desired load such as, but not limited to, a rail gun or the like.

In another embodiment the MHD generator uses channel geometry. In this embodiment, the primary and secondary windings of the HPPT are dipole type and produce a field normal to the direction of gas or plasma flow. The operation of this embodiment is the same as the operation of the first embodiment.

An object of this invention is to provide a self conditioned MHD generator.

Another object of this invention is to produce gigawatt power by accumulating current in a superconducting primary of an HPPT type transformer with a normal secondary.

Still another object of this invention is to utilize an MHD generator for the dual purpose of power generation and conditioning.

The above and other related objects and features of the invention will become apparent from a reading of the following description of the disclosure found in the accompanying drawing and the novelty thereof pointed out in the appended claims.

BRIEF DESCRIPTION OF THE DRAWING FIGURE

FIG. 1 depicts a cutaway schematic showing of the elements of the first embodiment of the invention and FIG. 2 depicts a cutaway schematic showing of the elements of the second embodiment of the invention.

DETAILED DESCRIPTION OF THE PREFERRED EMBODIMENT OF THE INVENTION

Figure 1:
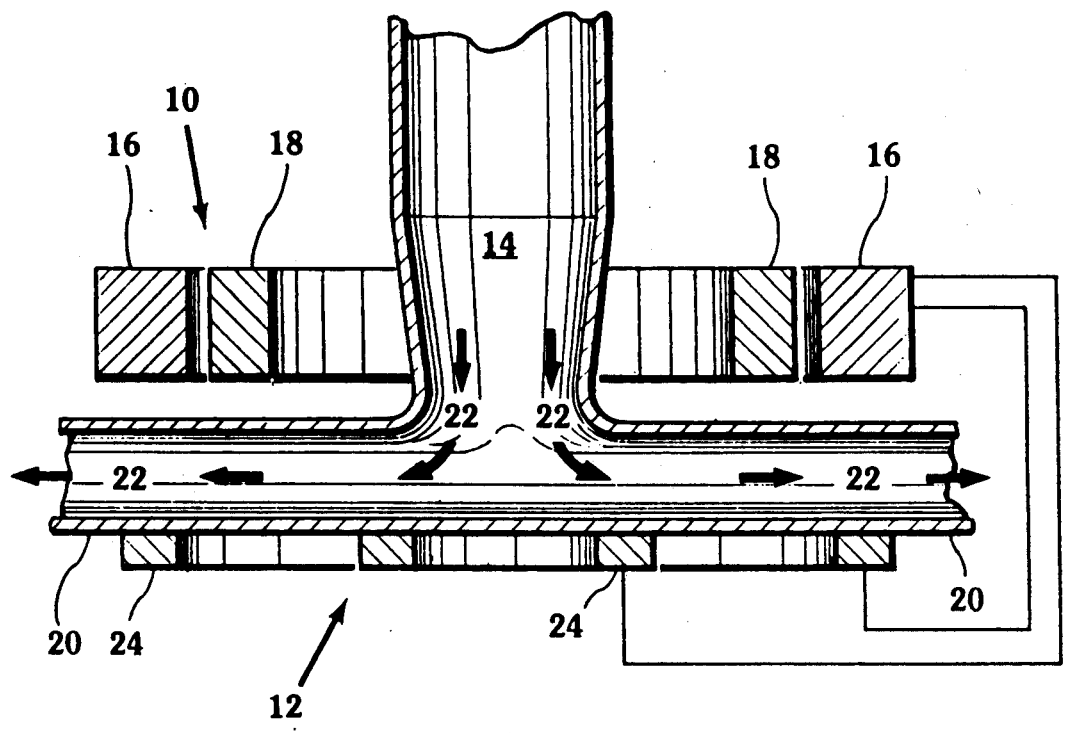

The drawing figures depict the positional relationship of the HPPT 10 and the disk type MHD generator 12 relative to the gas or plasma channel 14. The HPPT is formed of a superconducting primary 16 and a normal conducting secondary 18. In the first embodiment, the channel 14 passes through the center of the HPPT adjacent to the primary 16. The channel 14 makes an approximate ninety degree turn into a flattened chamber 20 which is perpendicular to the longitudinal center line of the channel 14. The gas or plasma flows along in the direction of the arrows 22. In the second embodiment of FIG. 2, the mid-channel 15 of the MHD is positioned in the channel 14 adjacent to the secondary winding of the HPPT.

The electrical current pickups 24 of the MHD generator are attached to the channel and electrically connected to the primary of the HPPT.

In operation, the primary of the HPPT is cooled by conventional means to a superconducting state. Current from an external source (not shown) is established in the superconducting primary 16 prior to the attachment of the electrical pickups 24 to the primary of the HPPT. The electrical pickups are then attached to the primary of the HPPT and the gas or plasma is caused to flow in the channel along arrows 22. The field established in the primary of the HPPT by the current therein charges the gas or plasma. This charge is removed by the electrical pickups of the MHD and passed to the primary of the HPPT for storage. As the stored current in the primary of the HPPT increases so does the field and hence the current picked up by the electrical pickups of the MHD and stored in the superconducting primary of the HPPT. When the current in the primary of the HPPT reaches a preselected level the superconducting primary of the HPPT is caused to go normal transferring this current to the secondary 18 and hence be delivered to a given load as a high power pulse.

Figure 2:
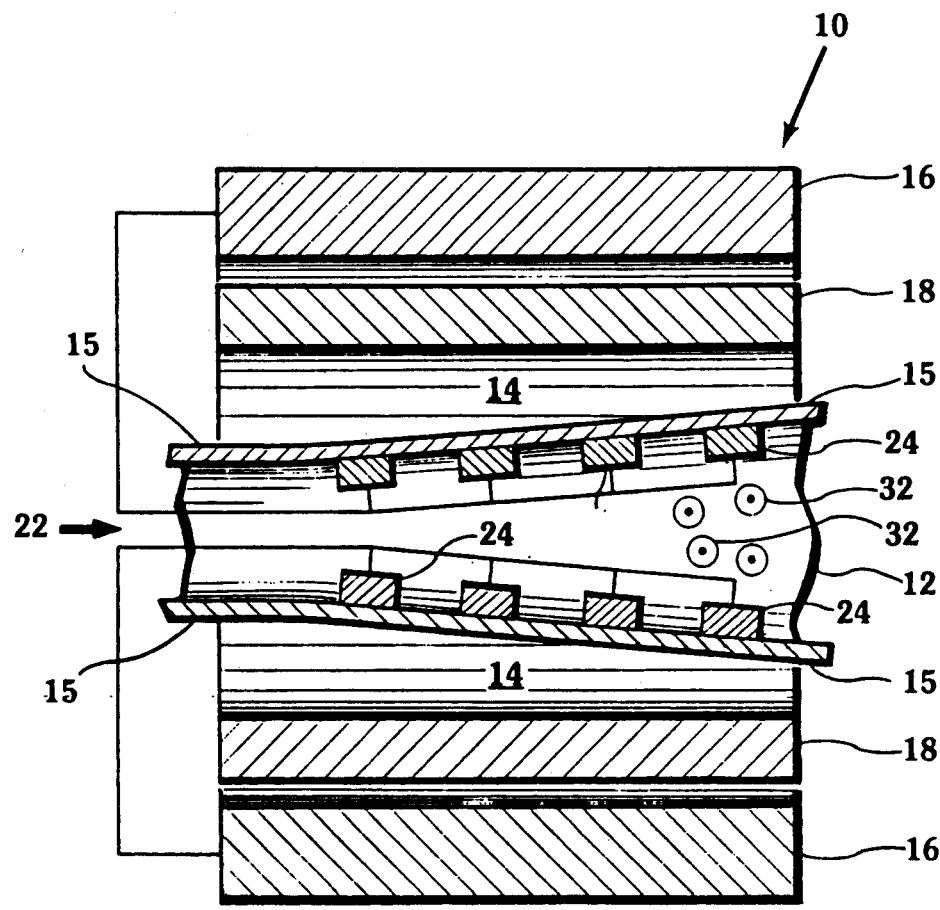

Drawing FIG. 2 depicted a pulse generator 25 using channel geometry shown as 30. The primary and the secondary windings 26 and 28 respectfully are dipole type windings providing a field 32 as shown in FIG. 2. Operation of the generator is similar to the disk type aforementioned.

The aforementioned steps for generating gigawatts of power and delivering a preselected pulse of that power can be repeated as often as required waiting only for the preselected level of current build up between pulses.

There are many prior art methods for supercooling a superconducting magnet, providing a hot gas or plasma flow and for causing a superconducting magnet to go normal. These methods do not form part of the claimed invention and therefore will not be discussed herein.

What is hereinbefore described is a novel self conditioning MHD generator for producing gigawatts of power on demand.

What is claimed is:

1. A high current MHD gigawatt pulse generator comprising:
   a pulse power transformer having a superconducting primary winding and a normal secondary winding;
   a gas high temperature channel extending through said pulse power transformer adjacent to said primary winding and beyond;
   a magnetohydrodynamic disk generator having electrical current pickups positioned opposite said pulse power transformer attached to said channel whereby gas in said channel flows through magnetic flux created by said primary winding of said pulse power transformer and across said pickups of said magnetohydrodynamic generator, said pickups are electrically attached to said primary for storing current from said electrical current pickups therein;
   means for initially storing current in said primary; and
   means for supplying a gas flow through said channel.

2. The invention as defined in claim 1 additionally comprising means for causing said primary winding to go normal.

3. The invention as defined in claim 1 wherein said channel is linear and said pulse power transformer is comprised of dipole magnets.

4. A method of producing high power pulses comprising the steps of:
   passing a high temperature gas through an MHD generator channel whose magnet field is created by the primary winding of a power pulse transformer having a normal conducting secondary and a superconducting primary winding;
   configuring a magnetohydrodynamic generator adjacent to said gas and said power pulse transformer whereby power is generated in said magnetohydrodynamic generator;
   initially establishing a current in said primary of said power pulse transformer;
   connecting the output of said magnetohydrodynamic generator to said primary whereby the current from said generator is stored in said primary winding and said stored current produces an ever increasing strength field for said gas;
   driving said superconducting primary winding normal whereby the stored current in said primary is transferred to said secondary in the form of a high power pulse.

* * * * *